(12) United States Patent
Lee

(10) Patent No.: US 6,337,769 B1
(45) Date of Patent: Jan. 8, 2002

(54) IMAGE DISPLAY SYSTEM USING BLINDS

(75) Inventor: Jong Hoo Lee, Seoul (KR)

(73) Assignee: Hanil Vision Information Co., Ltd., Seoul (KR)

( * ) Notice: Subject to any disclaimer, the term of this patent is extended or adjusted under 35 U.S.C. 154(b) by 0 days.

(21) Appl. No.: 09/455,361

(22) Filed: Dec. 6, 1999

(30) Foreign Application Priority Data

Jun. 24, 1999 (KR) .............................. 99-24093

(51) Int. Cl.⁷ .................. G03B 21/60; G03B 21/56; E06B 3/48
(52) U.S. Cl. .................. 359/454; 359/460; 160/115
(58) Field of Search ................. 359/454, 443, 359/460; 160/115

(56) References Cited

U.S. PATENT DOCUMENTS 4,739,567 A * 4/1988 Cardin ..................... 40/471
6,123,137 A * 9/2000 Levert ..................... 160/107

FOREIGN PATENT DOCUMENTS

JP 06195027 A * 7/1994 ................. 345/7

* cited by examiner

Primary Examiner—Christopher E. Mahoney
Assistant Examiner—Magda Cruz
(74) Attorney, Agent, or Firm—Bacon & Thomas

(57) ABSTRACT

In order to display the image from the projector, the image display system includes the blinds installed in front of the window and consisting of Yupo tracing film, transparent acryl, and coating vinyl which are attached to each other and enable to display image, and a projecting unit such as a slide projector or an LCD projector for projecting image to the blinds such that the image from the projector in a building can be displayed on a rear surface of the blinds through the window out of the building so to give effect of transferring information and providing advertisement and publicity.

12 Claims, 5 Drawing Sheets

IMAGE DISPLAY SYSTEM USING BLINDS

BACKGROUND OF THE INVENTION

1. Technical Field

The present invention relates to an image display system using blinds near a window as a rear screen, which can be used for information delivery, advertisement, and publicity by displaying image on the blinds from a projector.

2. Description of the Prior Art

Generally, in order to view image in a slide film with use of a projector, after installing a screen in a suitable position, the image is projected on the screen from the projector.

In addition, when using the screen as a rear screen, the image from the projector is displayed through a rear surface of the screen. Therefore, when installing the rear screen to a window, the image outputted from the projector can be displayed outside the window so that the image can be seen from outside.

Such system for displaying image outside the window with installing the screen as a rear screen to the window is disclosed in Japanese Patent Publication No. Showa 6-195027.

The Japanese Patent Publication No. Showa 6-195027 is described with reference to FIG. 1 and FIG. 2.

FIG. 1 exemplarily shows a conventional image display system using a rear screen. FIG. 2 shows configuration of the image display system of FIG. 1.

As shown in FIGS. 1 and 2, the invention of the publicized Japanese patent "Information Transferring System" consists of a screen 10 installed inside a window 14 of a building 13 for displaying image on a rear surface thereof, a projector 12 for displaying image on the screen 10, a plurality of sound information output units 20 for outputting sound corresponding to the displayed image, a containment regenerating unit 11 for providing image signal and sound signal to the projector 12 and the sound information output unit 20, and a signal distributor 22 for dividing and outputting sound signal from the containment regenerating unit 11 to the sound information output unit 20.

The image outputted from the containment regenerating unit 11 of such system is projected on the screen 10 installed beside the window 14 of the building 13 and then displayed to the rear surface of the screen 10. The sound signals outputted from the containment regenerating unit 11 is divided through the signal distributor 22 and then outputted to a plurality of the sound information output unit 20.

Through such process, the image and sound outputted from the containment regenerating unit 11 in the building 13 are displayed outside the window 14 so be viewed and heard from outside.

However, such image display system using the conventional rear screen should be installed to the window separately. Moreover, when displaying image with use of the system, the blinds employed to the window should be removed completely. In addition, there is another problem that means for providing image and sound is limited in one sort.

SUMMARY OF THE INVENTION

The present invention is designed to overcome above problems of the prior art. Object of the present invention is to provide an image display system using blinds, which employs the blinds as a rear screen and displays image outputted from a projector, possibly connected to variable image devices.

In order to accomplish the above object, the present invention provides an image display system including blinds installed in front of a window for displaying image through a rear surface thereof, and a projecting unit for projecting image to the blinds.

BRIEF DESCRIPTION OF THE DRAWINGS

In order to illustrate the invention, some embodiments thereof are described in more detail below with reference to the accompanying drawings, wherein.

DETAILED DESCRIPTION OF THE PREFERRED EMBODIMENT

Hereinafter, preferred embodiments of the present invention will be described in detail with reference to the accompanying drawings.

Figure 1:
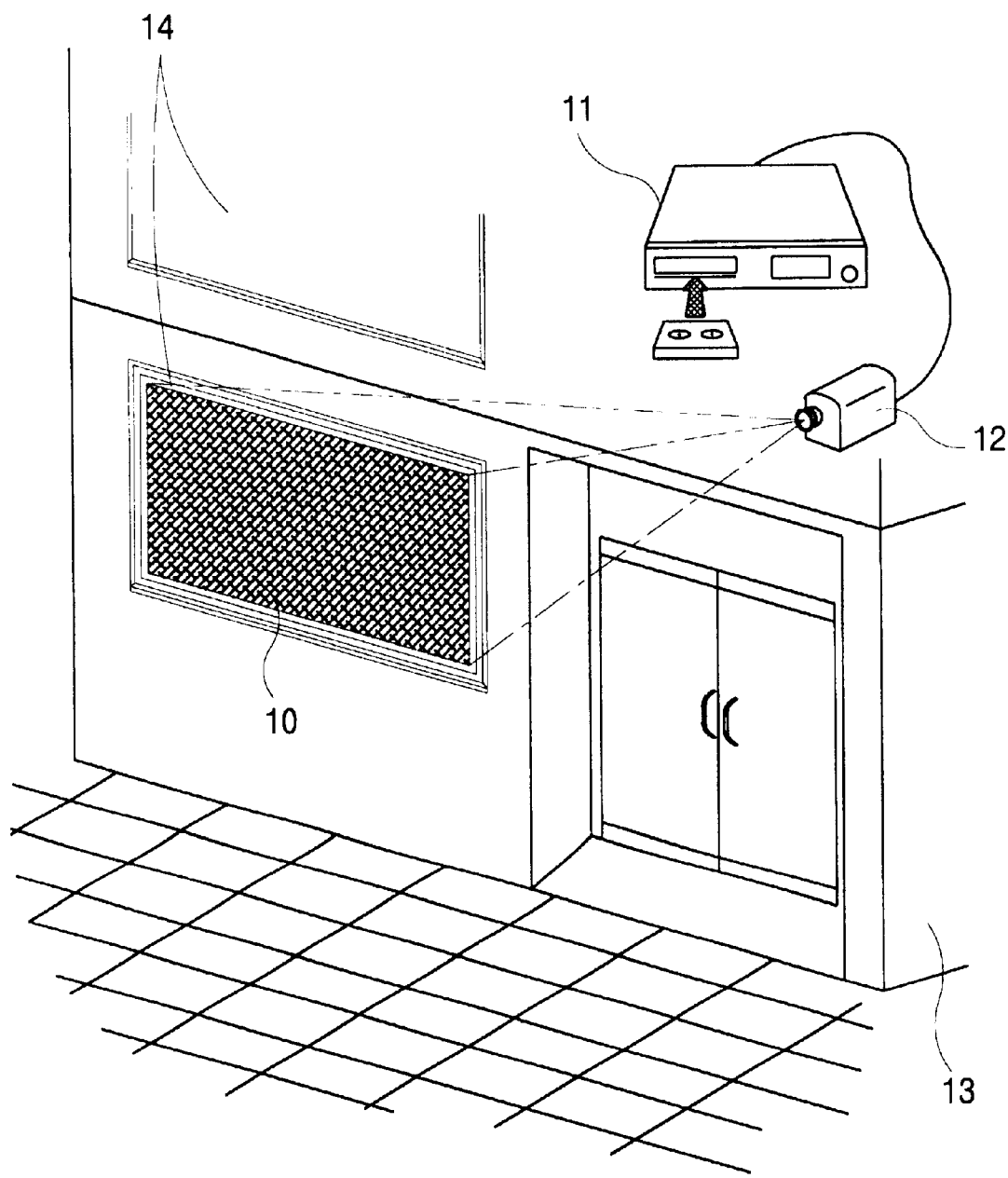
FIG. 1 exemplarily shows a conventional image display system using a rear screen.
Figure 2:
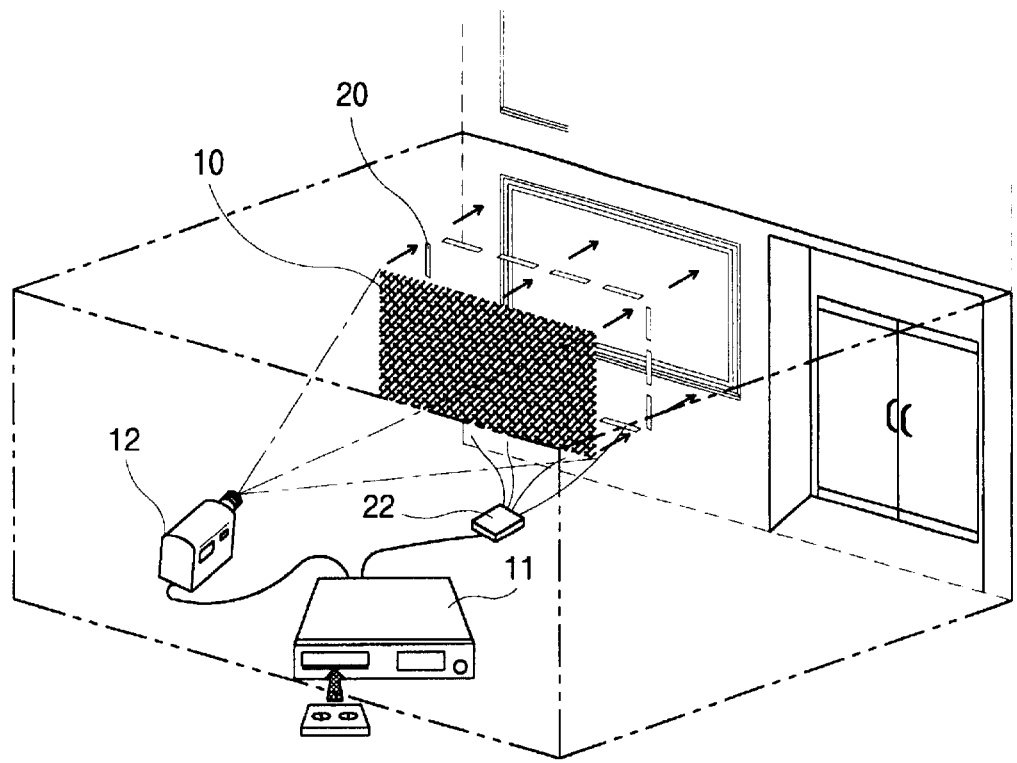
FIG. 2 shows configuration of the image display system of FIG. 1.
Figure 3:
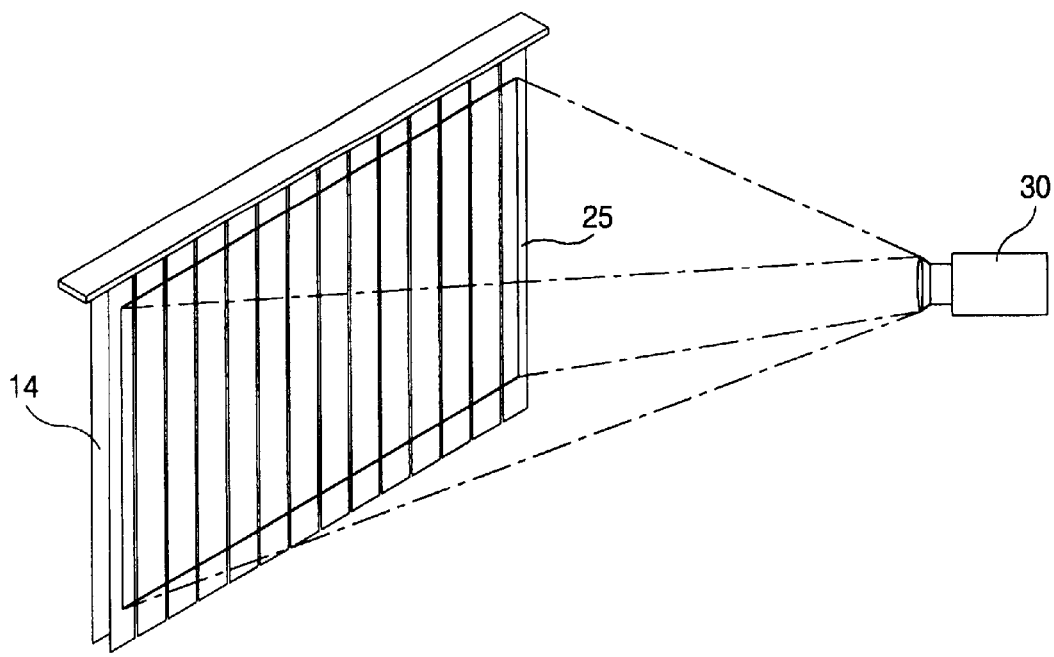
FIG. 3 exemplarily shows first embodiment of an image display system using vertical blinds of the present invention.

FIG. 3 exemplarily shows first embodiment of the image display system using vertical blinds.

In the first embodiment shown in FIG. 3, the image display system includes the vertical blinds 25 installed to the window 14, and a slide projector 30 for displaying image in a slide film on the vertical blinds 25. The vertical blinds 25 are made of specific materials suitable for acting as a rear screen.

Figure 4:
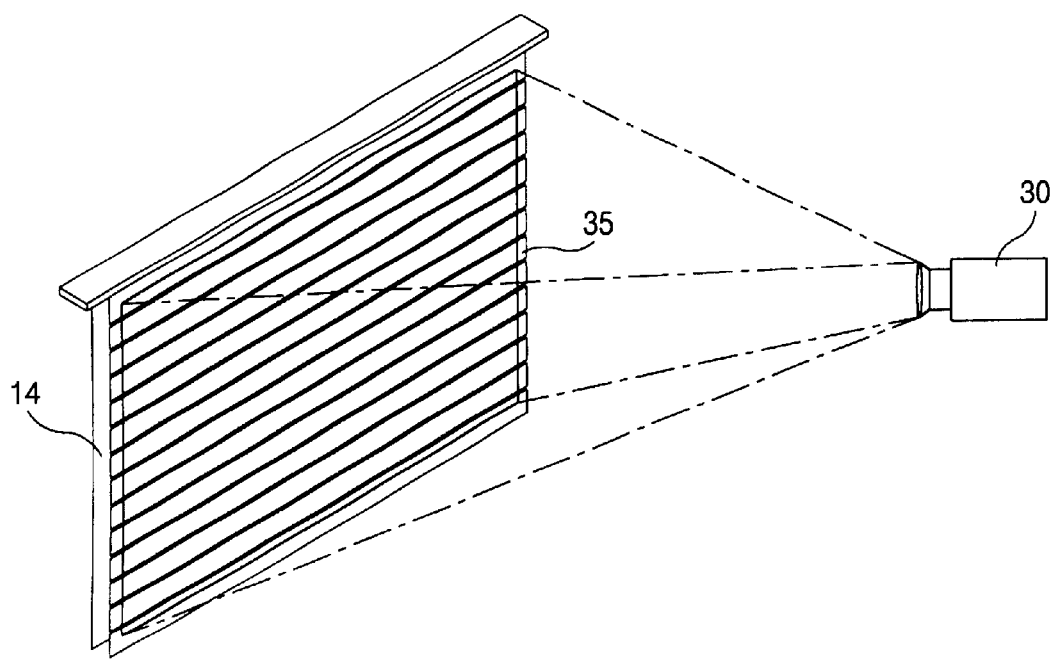
FIG. 4 exemplarily shows second embodiment of the image display system using horizontal blinds of the present invention.

FIG. 4 exemplarily shows second embodiment of the image display system using horizontal blinds.

The second embodiment of the image display system shown in FIG. 4 includes the horizontal blinds 35 installed to the window 14, and a slide projector 30 for displaying image in a slide film on the horizontal blinds 35. The horizontal blinds 35 are also made of specific materials suitable for acting as a rear screen.

Figure 5:
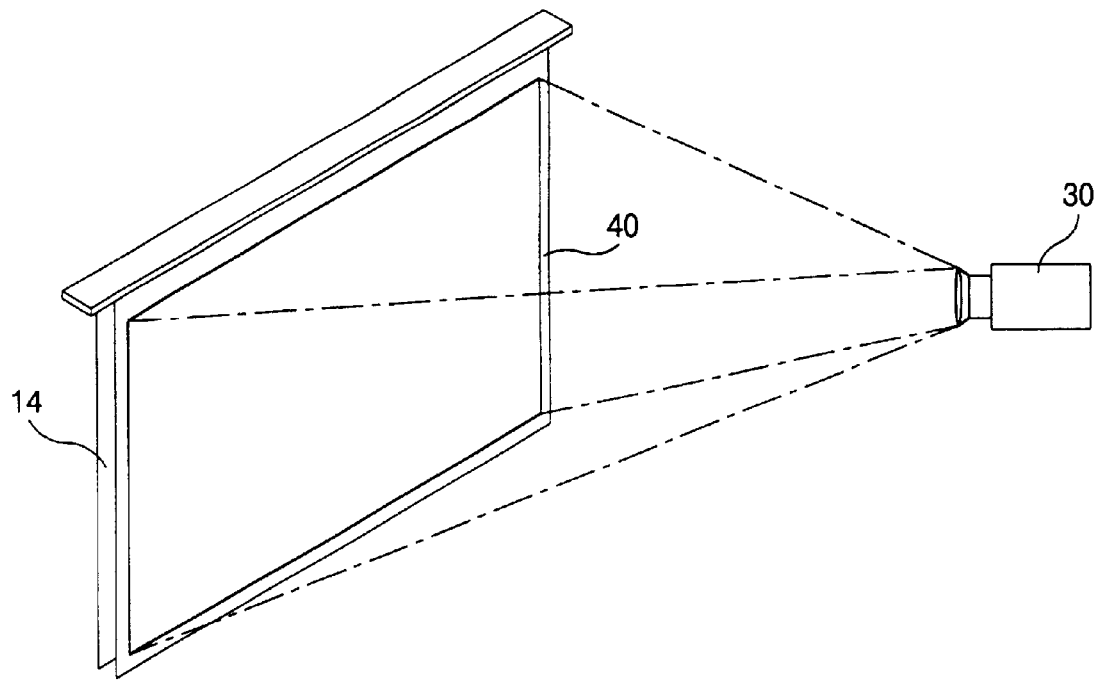
FIG. 5 exemplarily shows third embodiment of the image display system using roll blinds of the present invention.

FIG. 5 exemplarily shows third embodiment of the image display system using roll blinds.

The third embodiment of the image display system shown in FIG. 5 includes the roll blinds 40 installed to the window 14, and a slide projector 30 for displaying image in a slide film on the roll blinds 40. The roll blinds 40 are made of specific materials suitable for acting as a rear screen in one piece which can be rolled and unrolled.

Figure 6:
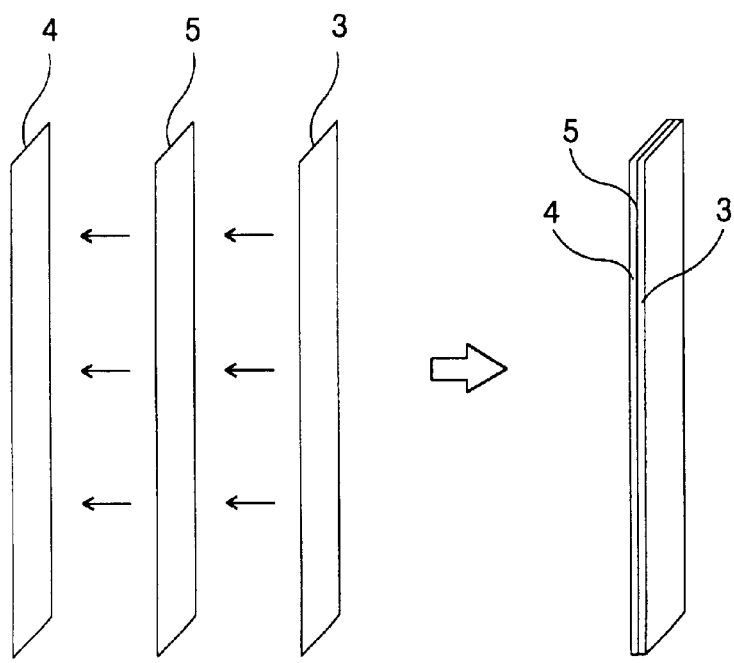
FIG. 6 shows configuration of the blinds employed in the first, second and third embodiments of the present invention.

Materials of the vertical blinds 25, the horizontal blinds 35 and the roll blinds 40 acting as a rear screen is better described referring to FIG. 6, which shows configuration of the blinds employed in the first, second and third embodiments.

As shown in FIG. 6, each of the vertical blinds 25, the horizontal blinds 35 and the roll blinds 40 includes a Yupo tracing film 4 positioned toward the window to be an outside surface of the blinds, a transparent acryl 5 attached to the Yupo tracing film 4, and a coating vinyl 3 positioned opposite to the window to be an inside surface of the blinds.

The Yupo tracing film 4 is translucent and made by coating synthetic paper, prepared by mixing materials of general high strength vinyl and paper, with use of oil such that the image outputted from the slide projector 30 can be displayed through a rear surface thereof. The transparent acryl 5 should transmit image from the projector very well. The transparent acryl 5 is made of polycarbonate film of which thickness is 0.1 mm in case of the roll blinds 40 or 0.2 mm~1 mm in case of the vertical and horizontal blinds 25, 35 using rigid slots. The coating vinyl 3 can has various colors harmonic to surroundings. The coating vinyl 3 can also be a film or texture. Depending on circumstances, the blinds can be constructed by attaching the Yupo tracing film 4 directly to the transparent acryl 5 without the coating vinyl 3.

Operation of the present invention as constructed above is described with reference to the accompanying drawings.

Figure 7:
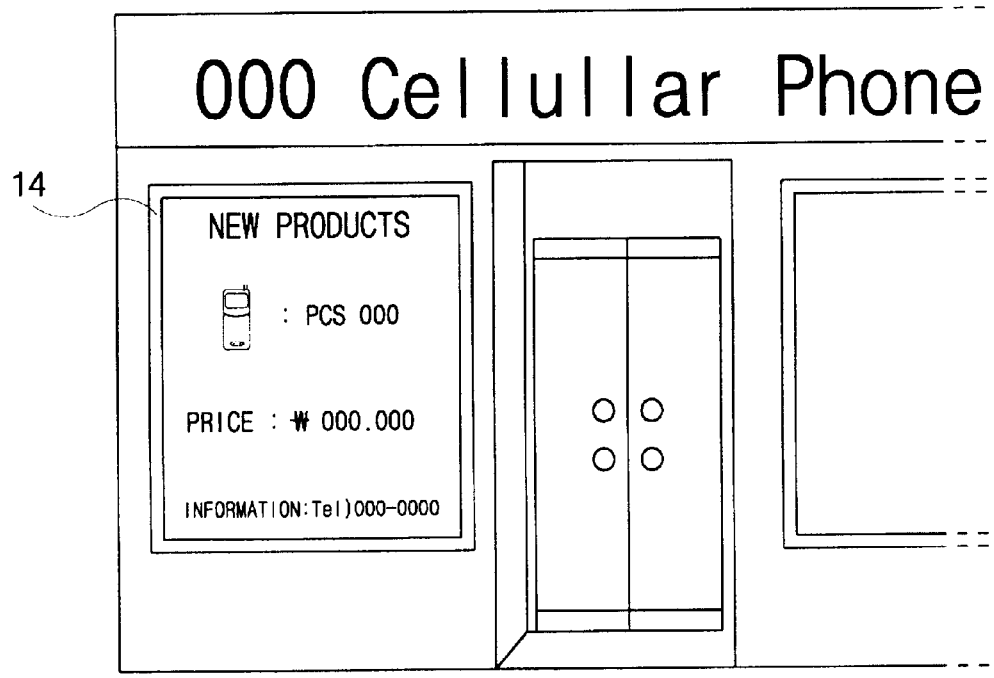
FIG. 7 shows examples of displayed images in the first, second and third embodiments of the present invention.

FIG. 7 exemplarily shows image displayed in the first, second and third embodiments.

Referring to FIGS. 3, 4, 5, 6 and 7, the slide projector 30 projects image in the slide film onto the vertical blinds 25, the horizontal blinds 35, and the roll blinds 40 according to each embodiment. The image from the slide projector 30 transmits the coating vinyl 3 and the transparent acryl 5 which are first and second layers of the blinds. Therefore, the image transmitting through the coating vinyl 3 and the transparent acryl 5 is displayed on the rear surface of the screen with use of the Yupo tracing film acting as a rear screen. If contents in the slide film corresponds to a specific product advertisement, the blinds functions as a rear screen through a window 14 of a store as shown in FIG. 7 such that the advertising pictures showing the contents can be displayed outside. Therefore, one who is in outside of the store can recognize the content. Moreover, when wanting other contents to be displayed, what is needed is just to change slide films inserted into the slide projector 30.

Because the above three embodiments employ only the slide projector 30, displayed are only the contents in the slide film.

However, when employing an LCD projector 50 instead of the slide projector 30, more variable image signals can be displayed.

Another embodiment employing the LCD projector 50 is described with reference to FIG. 8.

Figure 8:
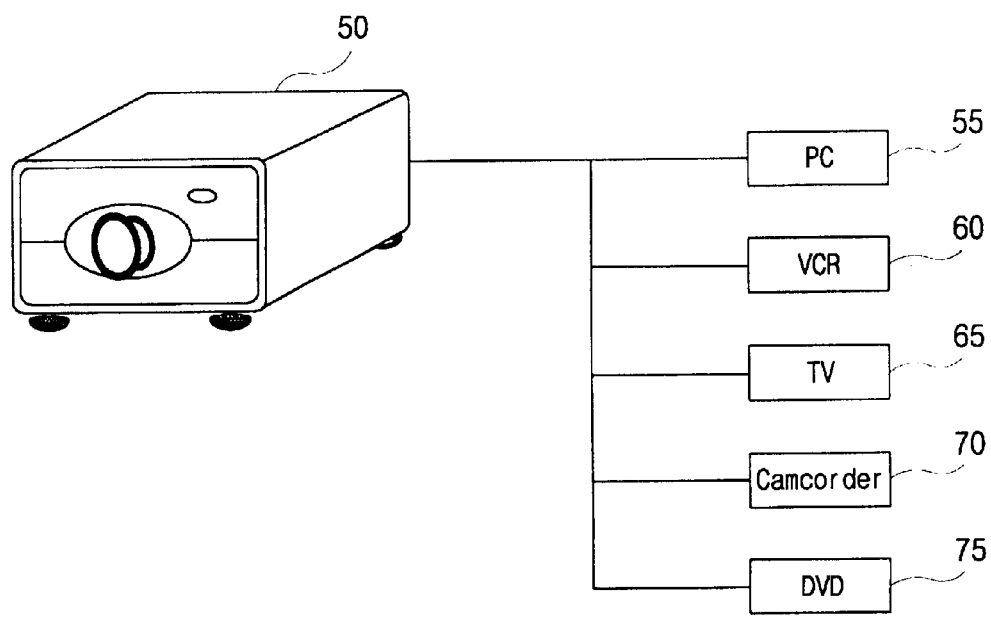
FIG. 8 shows an example of an LCD projector for displaying variable image signal.

FIG. 8 shows an example of the LCD projector for displaying variable image signals.

As shown in FIG. 8, the LCD projector 50 for displaying variable image signals has variable connecting terminals for permitting connection to PC 55, VCR 60, TV 65, camcoder 70, DVD 75, etc. For example, when wanting Internet scene displayed on the blinds, an operator connects the PC 55 to the connecting terminal of the LCD projector 50 and then connects with the Internet. Then, the LCD projector 50 receives Internet image signals from the PC 55 and then displays the image on the blinds such that the image can be viewed out of the window 14.

On/off control of the projecting device can be managed with use of a wire or wireless control device.

Similar to the PC 5, images from the VCR 60, the TV 65, the camcoder 70 and the DVD 75 can be viewed out of the window 14 when projecting the images on the blinds with use of the LCD projector 50.

Through above processes, the image display system can be implemented with intention to the present invention.

As can be known in the above description, the present invention has effect of displaying information or advertisement through the blinds by making the blinds, conventionally installed at the window, with materials of a rear screen and projecting the images from the slide projector or the LCD projector on the rear surface of the blinds such that the images can be viewed out of the window.

What is claimed is:

1. Blinds for rear screen mounted to a window, which is openable by folding a plurality of slats,
   wherein a plurality of the slats comprise:
      translucent members for blocking light from outside and displaying image; and
      light transparent members attached to the translucent members for maintaining strength of the slats and transmitting projected image.

2. Blinds for rear screen as claimed in claim 1, wherein the light transparent member has a predetermined color on an opposite surface to a surface attached to the translucent member.

3. Blinds for rear screen as claimed in claim 1, wherein the translucent member is made by coating synthetic paper, mixing general high strength vinyl and paper, with use of oil.

4. Blinds for rear screen as claimed in claim 1, wherein the light transparent member is transparent acrylic resin of polycarbonate film having a predetermined thickness.

5. Blinds for rear screen as claimed in claim 1, wherein the translucent member and the light transparent member are attached by adhesive means which is made by blending nontoxic silicon, petroleum, and bond.

6. An image display apparatus comprising:
   blinds for rear screen having a plurality of foldable slats including translucent members for displaying image and light transparent members for transmitting projected image;
   projecting device for projecting image beam toward the light transmitting members of the blinds for rear screen; and
   image regenerative device for providing image signals to the projecting device,
   wherein the blinds for rear screen is installed to be openable with the translucent members positioned near a window inside a building;
   wherein the image is displayed on the translucent members by projecting image beam from the projecting device with spreading the blinds for rear screen and so closing the window, such that the image is viewed from outside of the building.

7. An image display apparatus as claimed in claim 6, wherein the projecting device is a slide projector for projecting image in slide films.

8. An image display apparatus as claimed in claim 7, wherein the blinds is one of vertical blinds, horizontal blinds and roll blinds according to opening type of the window.

9. An image display apparatus as claimed in claim 6, wherein the projecting device is an LCD projector for projecting image from at least one of PC, VCR, TV, camcoder and DVD.

10. An image display apparatus as claimed in claim 9, wherein the blinds is one of vertical blinds, horizontal blinds and roll blinds according to opening type of the window.

11. An image display apparatus as claimed in claim 6, wherein the projecting device comprises wire or wireless operation manipulating means.

12. An image display apparatus as claimed in claim 6, wherein the blinds is one of vertical blinds, horizontal blinds and roll blinds according to opening type of the window.

* * * * *